March 5, 1968   O. W. JOHNSON   3,371,794
MANIFOLDED HYDROCYCLONE UNIT
Original Filed Nov. 14, 1962   3 Sheets-Sheet 1

INVENTOR.
OSCAR W. JOHNSON
BY
*Earle R. Marden*
ATTORNEY.

INVENTOR.
OSCAR W. JOHNSON
BY
Earle R. Marden
ATTORNEY.

March 5, 1968  O. W. JOHNSON  3,371,794
MANIFOLDED HYDROCYCLONE UNIT
Original Filed Nov. 14, 1962  3 Sheets-Sheet 3

INVENTOR.
OSCAR W. JOHNSON
BY
Earle R. Marden
ATTORNEY.

United States Patent Office 3,371,794
Patented Mar. 5, 1968

3,371,794
MANIFOLDED HYDROCYCLONE UNIT
Oscar W. Johnson, Greenwich, Conn., assignor to Dorr-Oliver Incorporated, Stamford, Conn., a corporation of Delaware
Continuation of applications Ser. No. 237,471, Nov. 14, 1962, and Ser. No. 483,021, Aug. 23, 1965. This application Nov. 28, 1966, Ser. No. 597,477
4 Claims. (Cl. 210—512)

ABSTRACT OF THE DISCLOSURE

A manifolded hydrocyclone unit having a plurality of ceramic cyclones reinforced against thermal and mechanical shocks and stresses by an encapsulating metallic shell fused to the ceramic body of the cyclone and placing the ceramic body under compression.

This application is a continuation of applications Ser. No. 237,471, filed Nov. 14, 1962, and Ser. No. 483,021, filed Aug. 23, 1965, both now abandoned.

This invention relates generally to the encapsulation of ceramic objects and more particularly to a manifolded hydrocyclone unit which incorporates a plurality of encapsulated ceramic hydrocyclones.

Throughout the specification the term ceramic is employed to denote a substantially non-metallic material with high wear resistant characteristics. These ceramics normally are capable of withstanding high temperatures and pressures and are extremely hard and strong in compression. However, ceramics have the basic disadvantage that their tensile strength is low and they damage readily from thermal and/or mechanical shock.

Prior to this invention ceramic hydrocyclones have been used in applications where the operating temperatures and pressures involved were fairly high and the material being handled was very abrasive. It was necessary, therefore, to construct the hydrocyclones from a ceramic material which would withstand the abrasive action of the material being handled. It was then found that the ceramic material employed withstood the abrasive action of the material being separated but had a very short service life due to the thermal and mechanical shocks involved in the application. In fact in several applications the ceramic hydrocyclones completely disintegrated due to these shocks. As a solution to the problem it has been proposed to reinforce the ceramic members by a metallic sleeve in order to resist the above mentioned stresses. Various methods of construction of these reinforced ceramic bodies have been proposed but none of these proposals appeared satisfactory. As an example, it was suggested to reinforce such ceramic bodies by shrink fitting a metal reinforcing sleeve or casing onto the outside of the body. However, because of the large coefficient of expansion of most metallic materials, the reinforcing casing is apt to grow at high temperature and separate from the ceramic body since the ceramic body has a lower coefficient of expansion.

Another serious problem encountered in the use of ceramic hydrocyclones was a method of mounting a plurality of such hydrocyclones in parallel so that the mechanical stresses set up by the mounting members did not crack or break the ceramic members. Further, such hydrocyclones had to be mounted in such a manner that the overall unit did not leak.

It is, therefore, an object of the invention to provide a manifolded cyclone unit employing encapsulated ceramic cyclones which are resistant to thermal and mechanical shocks.

A second object of the invention is to provide a compact manifolded cyclone unit which is readily assembled and efficient in operation.

A further object of the invention is to provide a compact manifolded hydrocyclone unit which employs encapsulated ceramic hydrocyclones which are securely mounted within the unit and provide long service life.

A still further object of the invention is to provide a ceramic hydrocyclone with an encapsulating metallic shell fused to the ceramic material which will withstand severe mechanical and thermal shocks without damage.

A fifth object of the invention is to encapsulate a ceramic body by a metallic shell in order to provide a reinforced ceramic member which will withstand severe mechanical and thermal stresses.

Other objects and advantages of the invention will become apparent as the specification proceeds to describe the invention with reference to the accompanying drawings, in which.

Figure 1:
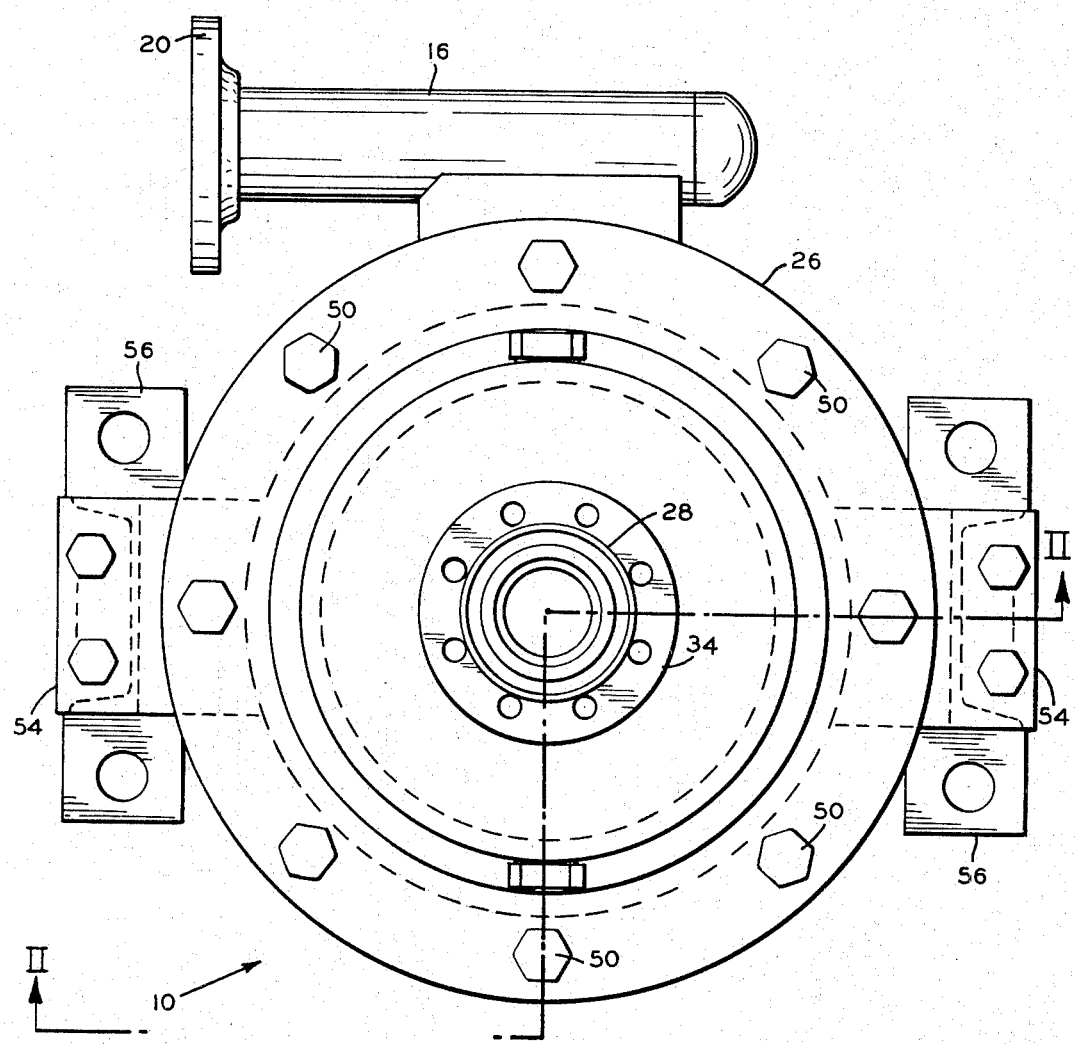
FIG. 1 is a top view of my new and improved manifolded hydrocyclone unit.
Figure 2:
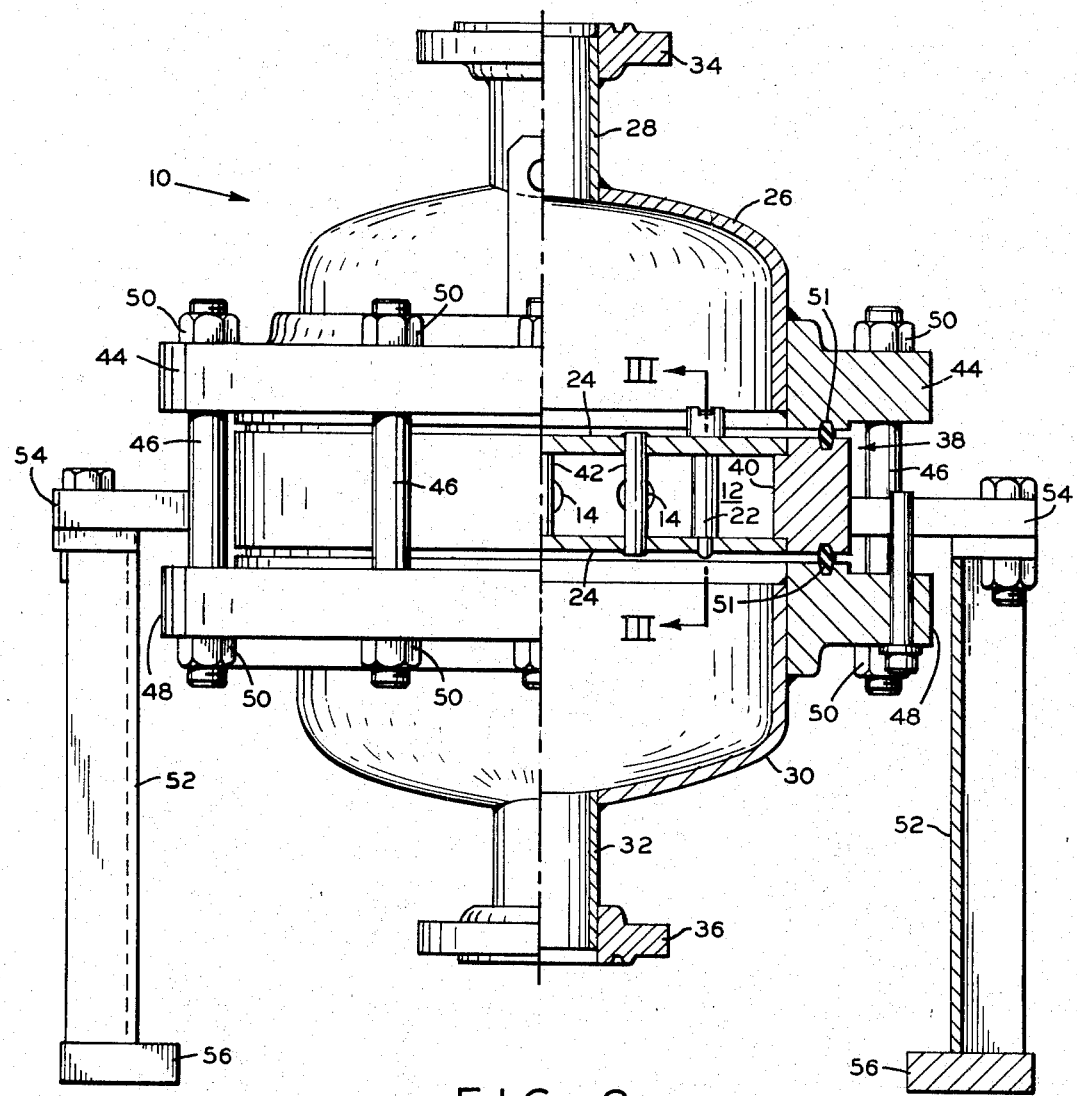
FIG. 2 is a view partially in section taken on line II—II of FIG. 1.

Looking now particularly to FIGS. 1 and 2 the general operation of the manifolded hydrocyclone unit 10 will be explained. A slurry of liquid and solid material is supplied to the feed chamber 12 through apertures 14 which are in communication with inlet pipe 16. Inlet pipe 16 is provided with flange member 20 for coupling to a feed conduit (not shown).

The feed slurry is then tangentially supplied into a plurality of hydrocyclones 22 sealingly secured in feed chamber 12 between upper and lower grid plates 24 and separated centrifugally into a heavy fraction and a light fraction. The light fraction overflow from the hydrocyclones 22 is collected in upper housing 26 and supplied to the point of use via overflow outlet 28. The heavy fraction underflow from the hydrocyclone units 22 is collected in the lower housing 30 and directed to its point of use via underflow outlet conduit 32. Flange members 34 and 36 are attached to the overflow and underflow outlets 28 and 32, respectively, to provide a means to couple the manifolded hydrocyclone unit to outlet conduits (not shown).

Manifolded hydrocyclone unit 10 consists basically of three sections, namely upper housing 26, lower housing 30, and an intermediate feed section 38. Intermediate feed section 38 employs an annular ring 40 to support grid plates 24 between which a multiplicity of hydrocyclones 22 are secured in a maner hereinafter described. A plurality of support members 42 extend between and are attached to the grid plates 24 by any suitable means to provide rigidity to the feed section 38.

An annular flange 44 is welded or otherwise secured to upper housing 26 and accommodates a plurality of bolts 46 which also extend through another annular flange 48 which is welded or otherwise secured to lower housing 30. By proper tightening of nuts 50, upper housing 26, intermediate feed section 38, and lower housing 30 are joined to form a manifolded hydrocyclone unit. Metallic O-rings 51, commonly called ring joints, are provided between intermediate feed section 38 and both the upper and lower housings 26 and 30, respectively, to seal these housings from the outside and to prevent leakage from the housings.

Manifolded hydrocyclone unit 10 can be mounted in a vertical position as shown by legs 52 bolted or otherwise secured to an annular steel plate 54 welded to annular ring 40. Feet members 56 are attached to legs 52, if desired.

Figure 3:
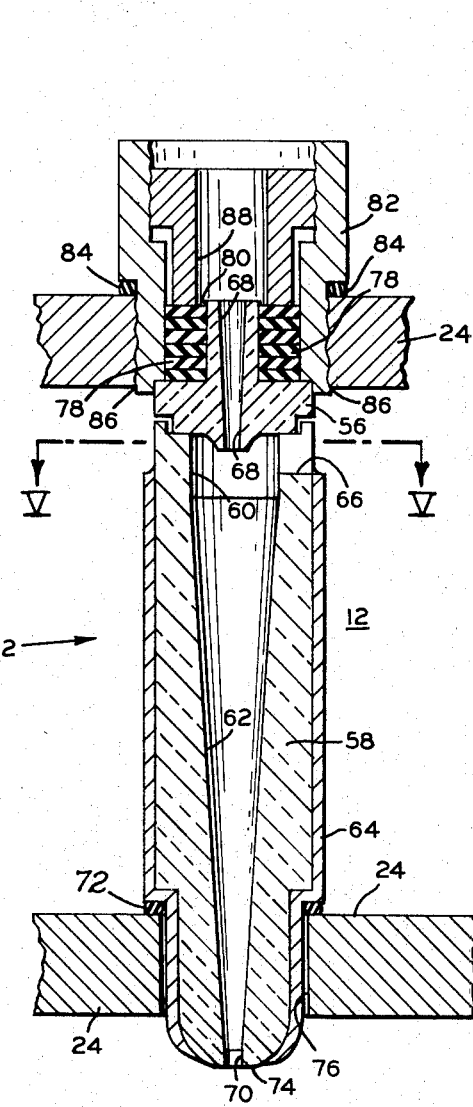
FIG. 3 is a blow up cross-sectional view taken on line III—III of FIG. 2, showing in detail the new and improved hydrocyclone.
Figure 5:
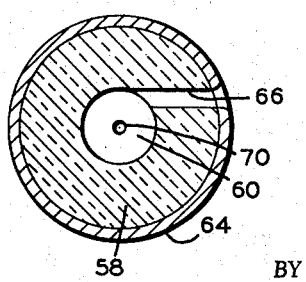
FIG. 5 is a cross-sectional view taken on line V—V of FIG. 3.

FIGS. 3 and 5 show in detail the hydrocyclones employed as part of the invention. Basically the hydrocyclone 22 consists of a cap or vortex finder 56, an inner ceramic body 58 which has a cylindrical bore 60 connecting with a conical bore 62, and an encapsulating steel shell 64. The operation of this type of hydrocyclone is conventional in that the slurry is supplied from feed chamber 12 into the cylindrical and conical bores of ceramic member 58 through a tangential inlet 66. The suspension will move in inner and outer vortices having the same rotational sense. However, the lighter inner vortex moves axially towards the base or overflow discharge opening 68 in vortex finder 56 while the heavier or denser outer vortex moves axially towards an apex or underflow opening 70. The fraction of higher concentration is discharged into lower housing 30 through the underflow opening 70 and the fraction of lower concentration discharges into upper housing 26 through the overflow opening 68.

As previously discussed, the use of highly abrasion resistant ceramic cyclones presented several difficult problems. Namely, that these materials, though they were high in abrasion resistance and compressive strength, tended to disintegrate readily under thermal and mechanical shocks when operating under a wide range of temperatures and pressures due to their low tensile strength.

It was found that the best method to increase the resistance of the ceramic hydrocyclones to thermal and mechanical shock was to encapsulate the cyclone with a metal shell in such manner that the metal shell placed the ceramic hydrocyclone under compression. In fact, in the method hereinafter described it was found that porosity of the ceramic hydrocyclone was greatly reduced due to the compressive force of the shell fused to the hydrocyclone.

In making the encapsulated hydrocyclones of the present invention, the ceramic body 58 is first placed in a die so as to define a predetermined space between the ceramic body and the die. Molten wax is then poured into this defined space and allowed to cool and solidify to form a hard outer wax shell for ceramic member 58. Then a plurality of these wax coated ceramic cyclone bodies are next placed in a holder and are dipped continuously into a ceramic slurry in order to build up a ceramic coating on the wax casing. The ceramic-wax coated ceramic bodies are then placed in an oven and fired slowly to solidify or harden the outer ceramic coating and to melt the wax between the outer ceramic coating and the inner ceramic body. Then molten metal is poured into the defined area or void remaining between the outer ceramic coating and the inner ceramic body. The whole structure is allowed to cool. The outer ceramic lining is then broken away leaving the encapsulated hydrocyclone shown in FIG. 3.

The molten metal on cooling shrinks and places the ceramic body 58 in compression. In fact it appears that some type of amalgamation occurs at the interface between the outer surface of the ceramic body and the inner surface of the encapsulating metallic shell so that the metallic liner is fused to the ceramic body. The amount of compressive force on the ceramic hydrocyclone depends on a number of variables such as the properties of the metal selected, the temperature of the molten metal, and the thickness of the shell desired.

The outer encapsulating metallic shell 64 may extend from a point below the tangential inlet to a point adjacent the apex opening 70. However, it is within the scope of the invention to only partially encapsulate ceramic cyclone body 58 or to totally encapsulate the cyclone leaving open only the inlet and the two outlets of the cyclone. It is also within the scope of the invention to change the outer shape of body 58. Very conceivably the outer surface of body 58 could be completely cylindrical. However, it should be noted that the bonding or fusing technique of the present invention is particularly advantageous in encapsulating ceramic parts which have external-surface longitudinal-section profiles which include irregularities or non-rectilinearities in profile such as shoulders and curved ends. These irregularities can be compressively encapsulated by the technique of this invention whereas prior art "shrink-fit" processes utilizing preformed, preheated metallic components are not feasible over irregularly configured portions of ceramic bodies.

Figure 4:
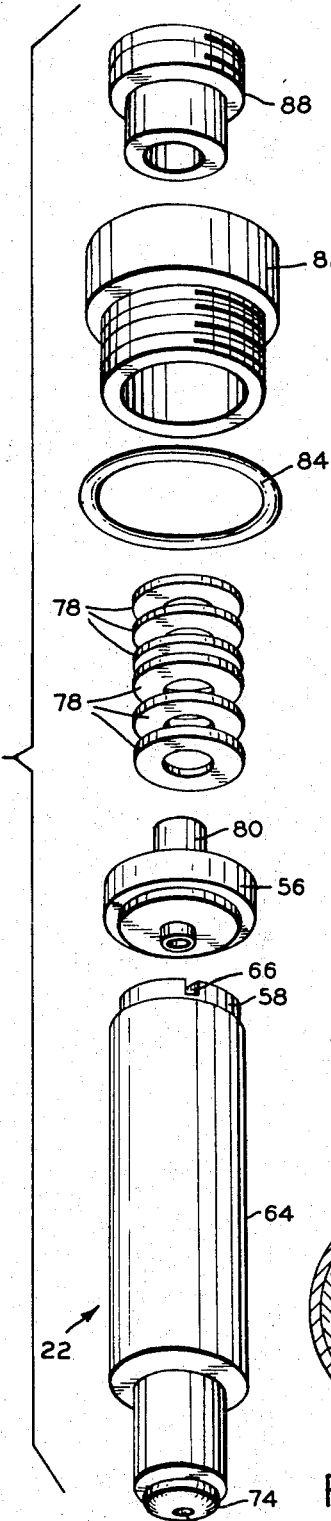
FIG. 4 is an exploded view of the hydrocyclone of FIG. 3.

Looking now to FIGS. 3 and 4 it can be seen that the metallic liner 64 serves a still further purpose. As pointed out previously hydrocyclone 22 is secured and sealed between grid plates 24 so that the feed slurry cannot leak between the cyclone ends and the grid plates and thus bypass the cyclonic separating action. In assembly, O-ring 72 is placed around the apex end 74 of the hydrocyclone 22 so that it will about the lower grid plate when the apex end 74 is placed in an opening 76 in the lower grid plate. Vortex finder 56 with gaskets 78 surrounding a spindle 80 of the vortex finder is then placed in position closing the base end of cyclone body 58. A threaded annular retainer 82 with an O-ring 84 therearound is screwed into a cyclone insertion opening 86 in upper grid plate 24 until O-ring 84 abuts and seals against upper grid plate 24. The internal surface of annular retainer 82 contacts gaskets 78 which in turn contact vortex finder 56. A threaded annular plug or tightener 88 is then screwed into retainer 82 against gaskets 78 to create a seal between the vortex finder and retainer 82 and to axially compress cyclone 22 against O-ring 72 abutting the lower grid plate. In this manner, the appropriate deforming force to provide an effective seal at O-ring 84 is established by applying a predetermined tightening torque to retainer 82, and the appropriate deforming force to provide effective seals at gaskets 78 and at O-ring 72 is independently established by applying a predetermined tightening torque to threaded plug 88. Gaskets 78 not only provide a seal between retainer 82 and cyclone 22 but also provide a resilient and conforming surface to contact and apply force to ceramic vortex finder 56, thus avoiding the fracture problems which accrue from pressure contact between a metal and a ceramic surface. Encapsulating metallic shell 64 tends to oppose radial reactions to the axial force applied to the cyclones and therefore reduces the possibility of cracking or breaking ceramic body 58.

It should be noted that opening 86 in upper grid plate 24 is larger in diameter than the encapsulated hydrocyclone 22. This is an important feature since it allows the removal and replacement of individual cyclones without displacement of the grid plates.

The herein disclosed manifolded hydrocyclone unit may be employed in many various applications. One typical example would be to process catalyst-containing oil stream from the fractionation bottom of catalytic crackers to recover the useful catalyst or remove objectionable products in the product. In this type of operation the hydrocyclone is concentrating highly abrasive catalyst at temperatures around 700° F. The hydrocyclones in this type of operation would preferably be composed of aluminum oxide with a stainless steel encapsulating shell fused to the exterior surface of the aluminum oxide. This type of manifolded hydrocyclone unit would be rated at approximately 150 p.s.i. and can operate at temperatures as high as 1300° F. The individual encapsulated hydrocyclones are capable of operation under pressures as high as 10,000 p.s.i. The maximum range of operation depends on the strength of the overall manifolding housing and its securing means.

The herein disclosed method of encapsulating a ceramic hydrocyclone is also applicable to other ceramic bodies which have a tendency to crack or disintegrate under extreme pressure and/or temperature conditions.

The disclosed apparatus has many obvious advantages not present in prior art devices. The manifolded hydrocyclone unit is simple and relatively inexpensive to manufacture. It employs a new and novel hydrocyclone which is not only highly resistant to abrasive wear but also will withstand severe mechanical and thermal shocks. The disclosed hydrocyclones also reduce the possibility of damage during fabrication due to the mechanical stress applied to securely bring the various components into operative relationship. The herein disclosed hydrocyclones take advantage of the inherent compressive characteristics of ceramics by fusing a metallic shell around the exterior thereof to place the ceramic under further compression in order to increase the overall tensile strength of the hydrocyclone.

As this invention may be embodied in several forms without departing from the spirit or essential characteristics thereof, the present embodiment is illustrative and not restrictive. The scope of the invention is defined by the appended claims rather than by the description preceding them, and all embodiments which fall within the meaning and range of equivalency of the claims are therefore intended to be embraced by those claims.

I claim:
1. A separation unit comprising:
   (a) a housing;
   (b) a pair of members separating said housing into a first and a second discharge chamber and a feed chamber;
   (c) a plurality of ceramic hydrocyclones positioned between said members, said hydrocyclones each having an overflow opening in flow communication with said first discharge chamber, an underflow opening in flow communication with said second discharge chamber, and a feed inlet in flow communication with said feed chamber;
   (d) means securing each said hydrocyclone between said housing-separating members under axial compression;
   (e) means supplying a slurry under pressure through said feed chamber to said feed inlets for cyclonic separation into a light fraction and heavy fraction to be respectively delivered to said first discharge chamber through said overflow openings and into said second discharge chamber through said underflow openings;
   (f) and circumferential metallic encapsulations intimately matching the irregularities of the external surfaces of said ceramic hydrocyclones and extending axially throughout a substantial length of said hydrocyclones between said housing-separating members, said ceramic cyclones having a stress-free size relationship with respect to said metallic encapsulations such that said cyclones are subjected to compressive circumferential stresses by said metallic encapsulations at all temperatures up to the softening point of the metal whereby the radial reactions to the axial compressive force applied to the hydrocyclones by said housing-separating members are opposed by the compressive circumferential stresses imposed by said metallic encapsulations.

2. A separation unit as defined in claim 1 wherein said means securing each said hydrocyclone in axial compression between said housing-separating members comprises respective apertures in said members in axial alignment with said hydrocyclone, one of said apertures being of greater diameter than the largest diameter of the encapsulated hydrocyclone, an annular retainer means sealingly, removably secured in said one aperture, and an annular tightening means adjustably, sealingly secured between said retainer and one axial end of said hydrocyclone to compress the other end of said hydrocyclone against the housing-separating member adjacent the other aperture whereby the axial compression on each hydrocyclone can be individually adjusted while a sealed relationship at said one aperture to prevent feed leakage therethrough is maintained.

3. A separation unit as defined in claim 2 wherein each said metallic encapsulation has a shoulder adjacent said other end of said hydrocyclone and wherein said unit further comprises an annular seal disposed between each said shoulder and the adjacent housing-separating member whereby the axial compressive securing force is applied through said seal to prevent leakage at said other end of said cyclones.

4. A hydrocyclonic separation unit comprising:
   (a) a housing having at least two discharge outlets;
   (b) a pair of spaced-apart plates separating said housing into a first and a second discharge chamber respectively communicating with said discharge outlets and a feed chamber located between said plates, said plates respectively having aligned hydrocyclone-receiving apertures therein;
   (c) a plurality of ceramic hydrocyclones secured under axial compressive stress between said apertured, spaced-apart plates, said hydrocyclones each having an overflow opening in flow communication through an overflow-end-receiving plate aperture with said first discharge chamber, an underflow opening in flow communication through an underflow-end-receiving plate aperture with said second discharge chamber, and a tangential feed inlet in flow communication with said feed chamber;
   (d) means supplying a slurry under pressure through said feed chamber to said feed inlets for cyclonic separation into a light fraction and a heavy fraction to be respectively delivered into said first discharge chamber through said overflow openings and into said second discharge chamber through said underflow openings;
   (e) and circumferential metallic encapsulations intimately conforming to irregularities of the external surfaces of said ceramic hydrocyclones, said ceramic cyclones having a stress-free size relationship with respect to said metallic encapsulations such that said cyclones are subjected to compressive circumferential stresses by said metallic encapsulations at all temperatures up to the softening point of the metal, each said encapsulation extending from a point adjacent said tangential feed inlet to a point adjacent said underflow outlet, each said metallic encapsulation having an outwardly-facing shoulder adjacent said underflow end of said hydrocyclone to transmit the compressive axial securing force to one of said spaced-apart plates around said underflow-end-receiving aperture therein thereby preventing application of this force directly to said ceramic hydrocyclone;
   (f) and means adjacent said overflow end of said hydrocyclone to sealingly secure said overflow end in axial compression at the other spaced-apart plate comprising an annular retainer means sealingly, removably secured in said overflow-end-receiving aperture and an annular tightening means adjustably, sealingly secured in said retainer means to compressively seal with said overflow end of said hydrocyclone so as to compress said underflow end shoulder against said one plate whereby the axial compression on each hydrocyclone can be individually adjusted.

References Cited

UNITED STATES PATENTS

| | | | |
|---|---|---|---|
| 1,844,369 | 2/1932 | Ross | 55—459 |
| 1,922,013 | 8/1933 | Brady | 55—460 |
| 2,534,653 | 12/1950 | Austin et al. | 264—60 |
| 2,622,735 | 12/1952 | Criner | 209—211 |
| 2,734,630 | 2/1956 | Van Der Wal | 209—211 |

(Other references on following page)

| | | | |
|---|---|---|---|
| 2,765,918 | 10/1956 | Fontein et al. | 210—512 |
| 2,784,112 | 3/1957 | Nicholson | 264—60 X |
| 2,974,684 | 3/1961 | Ginavin et al. | 209—211 X |
| 3,016,597 | 1/1962 | Denes | 264—61 |
| 3,044,499 | 7/1962 | Frerich | 138—143 |
| 3,070,990 | 1/1963 | Krinov | 55—268 X |
| 3,129,173 | 4/1964 | Schulze | 210—512 |
| 3,129,727 | 4/1964 | Tanaka | 138—143 |
| 3,136,723 | 6/1964 | Erwin et al. | 210—512 |
| 3,141,479 | 7/1964 | Mickey | 138—143 |
| 3,173,451 | 3/1965 | Slayter | 138—143 X |

FOREIGN PATENTS

| | | |
|---|---|---|
| 762,070 | 11/1956 | Great Britain. |
| 80,059 | 12/1955 | Netherlands. |

OTHER REFERENCES

German printed application, 1,129,423, May 1962.

SAMIH N. ZAHARNA, *Primary Examiner.*

REUBEN FRIEDMAN, *Examiner.*

J. L. DE CESARE, *Assistant Examiner.*